Dec. 7, 1926.  F. H. EVANS  1,609,996
MEANS FOR DETERMINING THE MISALIGNMENT OF WHEELS OF VEHICLES
Filed Nov. 21, 1923

INVENTOR.
Frederick H. Evans
BY
HIS ATTORNEYS.

Patented Dec. 7, 1926.

1,609,996

UNITED STATES PATENT OFFICE.

FREDERICK H. EVANS, OF ROCHESTER, NEW YORK.

MEANS FOR DETERMINING THE MISALIGNMENT OF WHEELS OF VEHICLES.

Application filed November 21, 1923. Serial No. 676,132.

The present invention relates to a means for determining the misalignment of wheels of a vehicle and an object thereof is to provide a construction which is simple in operation and inexpensive to manufacture. A further object of the invention is to provide two movable wheel engaging elements which are caused to turn a pair of wheels, one of said elements being movable in the general direction of the axis of one of the wheels, while the other is held against movement in the direction of such axis so that the axially movable element will indicate the degree of misalignment of the wheels. Another object of the invention is to provide for testing the alignment of the wheels of a vehicle under normal rolling conditions.

To these and other ends the invention consists of certain parts and combinations of parts, all of which will be hereinafter described; the novel features being pointed out in the appended claims.

Figure 1:
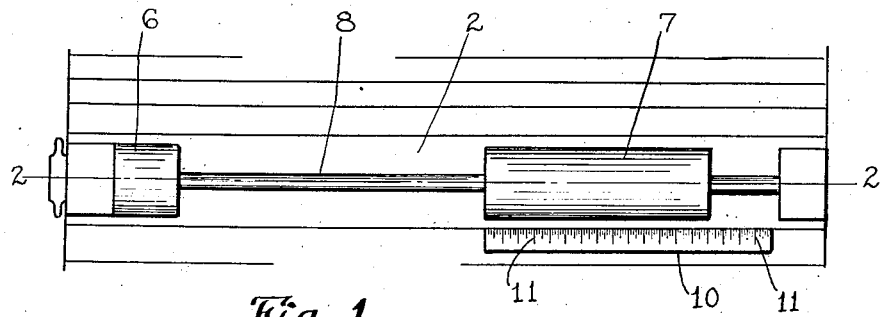
Fig. 1 is a fragmentary plan view of a portion of the invention.
Figure 2:
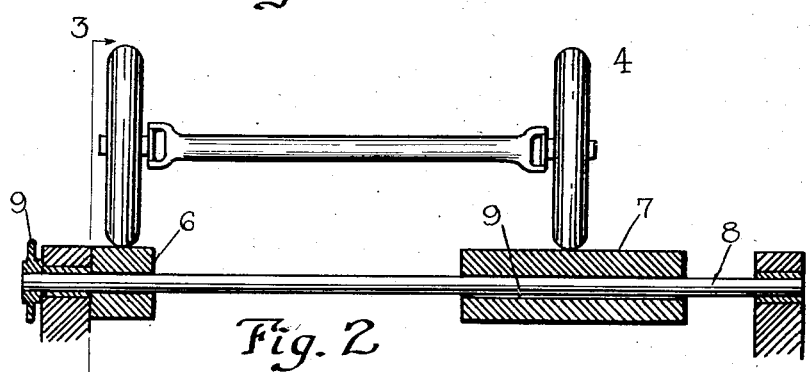
Fig. 2 is a section on the line 2—2, Fig. 1, showing a pair of wheels in cooperation with the movable elements.
Figure 3:
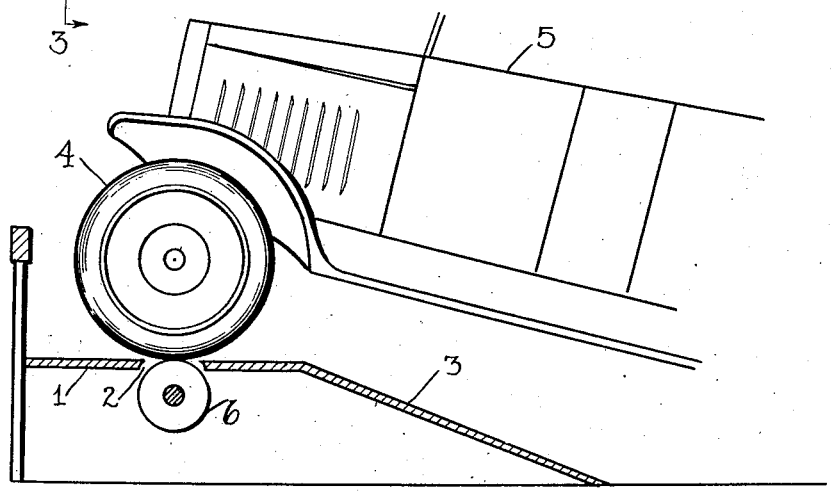
Fig. 3 is a section on the line 3—3, Fig. 2, showing the forward wheels of an automobile in cooperation with the movable elements.

In the illustrated embodiment of the invention, there is provided a suitable support comprising a flooring 1 having a slot 2 therein. A runway 3 leads to this flooring so that the front wheels 4 of an automobile 5 or other vehicle may travel upwardly on the support to be positioned over said slot 2. Operating in the slot 2 are two movable elements 6 and 7, each, in this instance, in the form of a roller or drum mounted on a common axis as by being secured to a single shaft 8 which is journalled in the support 1. The roller 6 is rigidly secured to the shaft so as to turn therewith but not to move axially thereof. The roller 7 is keyed to the shaft at 9 so as to turn with the shaft and, at the same time, to move axially of the shaft and in the general direction of the axis of turning of the wheels 4.

Provision is made for turning the shaft 8, comprising, in this instance, a sprocket wheel 9 keyed to the shaft in such a manner that the turning of the sprocket wheel turns the shaft. Any suitable means may be connected with the sprocket wheel to turn the latter so as to impart to the shaft 8 any desired predetermined number of rotations.

With the end in view of determining the amount of axial movement of the roller 7 a plate 10 is secured to the frame 1 at one side of the slot 2 and this plate has graduations 11 thereon which will indicate the amount of the axial movement of the roller 7.

In using the invention, a motor vehicle is driven so as to carry its front wheels onto the platform 1 and into engagement with the two movable elements 6 and 7. After the front wheels 4 of the motor vehicle have been properly positioned on the rollers 6 and 7, the shaft 8 is given a predetermined number of rotations and the direction in which the movable element 7 moves axially indicates whether the wheels "toe in" or "toe out," the amount of this movement indicating the degree of misalignment.

From the foregoing it will be seen that there has been provided a means for determining the misalignment of vehicle wheels in which two movable elements are provided one of the elements being held against lateral movement while the other is adapted for lateral movement. Provision is made for moving the movable elements to impart a rotation to two wheels engaging said members or elements the amount of movement of the movable elements being sufficient preferably to cause one or more complete rotations of the wheels on their spindles and the direction of the lateral movement of the laterally movable element determining whether the wheels "toe in" or "toe out". Indicating means is provided for determining the amount of the misalignment.

As the wheels are supported upon the movable elements the test is made for the misalignment thereof under normal rolling conditions.

What I claim as my invention and desire to secure by Letters Patent is:

1. Means for determining the misalignment of wheels of a vehicle comprising two elements movable in the same direction for turning two wheels of a vehicle, one of said movable elements being held against lateral movement with reference to the direction of its first named movement while the other of said movable elements has a mounting which permits a lateral movement of said element with reference to its first named direction of movement, and means connecting said elements to cause them to move together in the same direction.

2. Means for determining the misalignment of wheels of a vehicle comprising two movable elements movable in the same direction for turning two wheels of a vehicle, one of said movable elements being held against lateral movement with reference to the direction of movement of the first named movable element, while the other said movable element has a mounting which permits a lateral movement of said element with reference to the first named direction of movement, and means for determining such movement.

3. Means for determining the misalignment of the wheels of a vehicle comprising two rotary elements mounted to turn in the same direction, one of said elements being held against lateral movements, with reference to the direction of its first named direction of movement, while the other of said elements has a movement which permits lateral movement with reference to the first named direction of movement, and means for connecting said elements to cause them to move together.

4. Means for determining the misalignment of wheels of a vehicle comprising a shaft, two rotary wheel engaging elements connected to said shaft, one of said wheel engaging elements being rigid with the shaft and the other of said wheel engaging elements having a movement axially of the shaft.

5. Means for determining the misalignment of the wheels of a vehicle comprising two movable elements, means for moving said elements simultaneously in the same direction to impart a rotary movement to the wheels, and means permitting one of said elements to move laterally of such direction of movement under the action of a misalignment in the wheels.

FREDERICK H. EVANS.